United States Patent
Min et al.

(10) Patent No.: US 6,449,026 B1
(45) Date of Patent: Sep. 10, 2002

(54) FRINGE FIELD SWITCHING LIQUID CRYSTAL DISPLAY AND METHOD FOR MANUFACTURING THE SAME

(75) Inventors: Tae Yup Min; Seung Jun Yi, both of Seoul; Seung Hee Lee, Kyoungki-do; In Cheol Park, Seoul; Youn Hak Jeong, Kyoungki-do, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 2 days.

(21) Appl. No.: 09/599,372

(22) Filed: Jun. 22, 2000

(30) Foreign Application Priority Data

Jun. 25, 1999 (KR) .............................. 99-24179
Jun. 29, 1999 (KR) .............................. 99-25222

(51) Int. Cl.[7] ...................... G02F 1/136; G02F 1/1343
(52) U.S. Cl. .................... 349/141; 349/143; 349/43; 349/46
(58) Field of Search .................. 349/141, 143, 349/42, 46; 257/72

(56) References Cited

U.S. PATENT DOCUMENTS

| | | | |
|---|---|---|---|
| 4,542,960 A | | 9/1985 | Yang |
| 4,643,533 A | | 2/1987 | Armitage |
| 5,162,933 A | * | 11/1992 | Kakuda et al. ............... 349/46 |
| 5,309,264 A | | 5/1994 | Lien et al. |
| 5,576,862 A | | 11/1996 | Sugiyama et al. |
| 5,598,285 A | * | 1/1997 | Kondo et al. ................ 349/39 |
| 5,836,797 A | * | 11/1998 | Suzuki et al. ................ 445/24 |
| 5,959,706 A | * | 9/1999 | Nagata et al. .............. 349/110 |
| 5,959,708 A | | 9/1999 | Lee et al. |
| 5,977,562 A | * | 11/1999 | Hirakata et al. ............. 257/72 |
| 6,124,915 A | * | 9/2000 | Kodo et al. ................. 349/141 |
| 6,177,970 B1 | * | 1/2001 | Kim ........................... 349/43 |
| 6,233,034 B1 | * | 5/2001 | Lee et al. .................... 349/141 |

FOREIGN PATENT DOCUMENTS

| | | |
|---|---|---|
| JP | 55238922 | 10/1980 |
| JP | 57069281 | 4/1982 |
| JP | 58083478 | 5/1983 |
| JP | 60017419 | 1/1985 |
| JP | 60222825 | 11/1985 |
| JP | 02071616 | 3/1990 |
| JP | 03148636 | 6/1991 |
| JP | 09160073 | 6/1997 |
| JP | 11167120 | 6/1999 |
| JP | 11282427 | 10/1999 |

* cited by examiner

Primary Examiner—William L. Sikes
Assistant Examiner—Julie Ngo
(74) Attorney, Agent, or Firm—Ladas & Parry

(57) ABSTRACT

Disclosed is a fringe field switching liquid crystal display (FFS-LCD) and a method for manufacturing the same. The FFS-LCD comprises: a lower substrate; a plurality of gate bus lines extending along a selected direction on the lower substrate; a plurality of data bus lines disposed on the lower substrate in a manner such that they are crossed with the plurality of gate bus lines, for defining a unit pixel; a gate insulating film for insulating the gate bus lines and the data bus lines from each other; a thin film transistor located at a place where the gate bus lines and the data bus lines are crossed with each other; a pixel electrode formed on the gate insulating film, brought into contact with the thin film transistor and disposed in a space of the unit pixel; a counter electrode overlapped on the pixel electrode, the counter electrode cooperating with the pixel electrode for forming a fringe field which actuates all liquid crystal molecules existing on the pixel electrode and the counter electrode; and a passivation layer intervened between the pixel electrode and the counter electrode, wherein the pixel electrode and the counter electrode are made from a transparent conductive material and the plurality of gate bus lines are made as a metal film including aluminum.

8 Claims, 3 Drawing Sheets

FRINGE FIELD SWITCHING LIQUID CRYSTAL DISPLAY AND METHOD FOR MANUFACTURING THE SAME

BACKGROUND OF THE INVENTION

1. Field of the Invention

The present invention relates to a fringe field switching liquid crystal display (FFS-LCD) and a method for manufacturing the same, and more particularly, the present invention relates to an FFS-LCD in which a gate bus line is prevented from being damaged upon forming a counter electrode or a pixel electrode, and a method for manufacturing the same.

2. Description of the Related Art

Generally, the FFS-LCD is developed so as to increase an aperture ratio and a transmittance of an in-plane switching liquid crystal display (IPS-LCD), as described in Korean Patent Application No. 98-9243.

An FFS-LCD includes an upper substrate and a lower substrate which are separated from each other by a selected cell gap, a liquid crystal layer which is intervened between the upper and the lower substrates, and a counter electrode and a pixel electrode which are formed on an inner surface of the lower substrate. Each of the counter electrode and the pixel electrode is made of a transparent conductive material, and a distance between the counter electrode and the pixel electrode is set to be smaller than the selected cell gap. According to this, a fringe field is formed between and over the electrodes.

Referring to FIG. 1, there is shown a cross-sectional view of an FFS-LCD according to the convention art. A first indium tin oxide (ITO) is formed on a lower substrate 11. Then, a selected portion of the first ITO is patterned, thereby a counter electrode 12. After a metal film for a gate bus line is formed on the lower substrate 11 on which the counter electrode 12 is formed, a selected portion of the metal film is patterned thereby to form a gate bus line 13 and a common signal line (not shown). A gate insulating film 15 is deposited, to a predetermined thickness, on the lower substrate 11 on which the counter electrode 12, the gate bus line 13 and the common signal line are formed. An amorphous silicon layer and a doped silicon layer are sequentially deposited on the gate insulating film 15, and then, are patterned to include a selected portion of the gate bus line 13 thereby to form a channel layer 17 and an ohmic layer 18. Thereupon, after a metal film for a data bus line is formed on the gate insulating film 15 on which the channel layer 17 and the ohmic layer 18 are formed, by the fact that a predetermined portion of the metal film is patterned, source and drain electrodes 19a and 19b and a data bus line (not shown) are formed. A passivation film 20 is deposited on the gate insulating film 15 on which the source and drain electrodes 19a and 19b and the data bus line are formed, and then, is etched so that a selected portion of the drain electrode 19b is exposed. Thereafter, a second ITO is deposited on the passivation film 20 in a manner such that the second ITO is brought into contact with the exposed portion of the drain electrode 19b, and is patterned to have a comb teeth-shaped contour in a manner such that the second ITO is overlapped on the counter electrode 12, thereby to form a pixel electrode 21.

In the FFS-LCD of the convention art, constructed as mentioned above, the gate bus line 13 and the common signal line are formed on the same plane as the counter electrode 12, and specifically, the common signal line is brought into direct contact with the counter electrode 12. Therefore, aluminum (Al) having an etching speed which is similar to that of ITO used as a material for forming the counter electrode 12, cannot be properly used as a material for forming the gate bus line 13 and the common signal line. In other words, if the gate bus line 13 is formed of an aluminum layer, the counter electrode 12 is attacked by an etching solution for etching the gate bus line 13 when the gate bus line 13 is formed. Also, if an aluminum layer is direct-contacted with an ITO layer, a contact resistance is increased at a contact area.

To cope with this problems, in the conventional art, MoW which has a reduced reactivity with an ITO material, is mainly used for forming the gate bus line 13 and the common signal line. However, if a MoW layer is used as a material for forming the gate bus line and the common signal line, a line width should be increased since MoW has a signaling delay greater than that of a metal layer containing Al.

Moreover, since the gate insulating film 15 and the passivation film 20 are deposited between the counter electrode 12 and the pixel electrode 21, a distance between the electrodes 12 and 21 is lengthened. Due to this, an auxiliary capacitance is decreased.

SUMMARY OF THE INVENTION

Accordingly, the present invention has been made in an effort to solve the problems occurring in the related art, and an object of the present invention is to provide an FFS-LCD which has an increased aperture ratio, and a method for manufacturing the same.

Another object of the present invention is to provide an FFS-LCD in which a gate bus line is prevented from being damaged upon forming a counter electrode or a pixel electrode, and a method for manufacturing the same.

Still another object of the present invention is to provide an FFS-LCD which has an enhanced auxiliary capacitance, and a method for manufacturing the same.

According to one aspect of the present invention, there is provided an FFS-LCD comprising: a lower substrate; a plurality of gate bus lines extending along a selected direction on the lower substrate; a plurality of data bus lines disposed on the lower substrate in a manner such that they are crossed with the plurality of gate bus lines, for defining a unit pixel; a gate insulating film for insulating the gate bus lines and the data bus lines from each other; a thin film transistor located at a place where the gate bus lines and the data bus lines are crossed with each other; a pixel electrode formed on the gate insulating film, brought into contact with the thin film transistor and disposed in a space of the unit pixel; a counter electrode overlapped on the pixel electrode, the counter electrode cooperating with the pixel electrode for forming a fringe field which actuates all liquid crystal molecules existing on the pixel electrode and the counter electrode; and a passivation layer intervened between the pixel electrode and the counter electrode, wherein the pixel electrode and the counter electrode are made from a transparent conductive material and the plurality of gate bus lines are made as a metal film including aluminum.

According to another aspect of the present invention, there is provided an FFS-LCD comprising: a lower substrate; a plurality of gate bus lines extending along a selected direction on the lower substrate; a plurality of data bus lines disposed on the lower substrate in a manner such that they are crossed with the plurality of gate bus lines, for defining a unit pixel; a gate insulating film for insulating the gate bus lines and the data bus lines from each other; a thin film transistor located at a place where the gate bus lines and the data bus lines are crossed with each other; a pixel electrode formed on the gate insulating film, brought into contact with the thin film transistor and disposed in a space of the unit pixel; a counter electrode overlapped on the pixel electrode, the counter electrode cooperating with the pixel electrode for forming a fringe field which actuates all liquid crystal molecules existing on the pixel electrode and the counter electrode; and a passivation layer intervened between the pixel electrode and the counter electrode, wherein the gate bus lines include a pair of shielding sections which are located between the pixel electrode and the data bus lines, in a manner such that the pair of shielding sections extend parallel to the data bus lines, wherein the pixel electrode and the counter electrode are made from a transparent conductive material, and wherein the plurality of gate bus lines are made as a metal film including aluminum.

According to still another aspect of the present invention, there is provided a method for manufacturing an FFS-LCD comprising the steps of: forming a gate bus line and a shielding section on a predetermined region of a lower substrate; depositing a gate insulating film, an amorphous silicon layer and a doped semiconductor layer on the lower substrate; patterning selected portions of the doped semiconductor layer and the amorphous silicon layer and thereby forming an ohmic layer and a channel layer; forming a pixel electrode as a transparent conductive layer on the gate insulating film of one side of the channel layer; forming a source electrode and a drain electrode at both sides of the channel layer and a data bus line which is orthogonal to the gate bus line; forming a passivation film on the gate insulating film at a place where the data bus line and the pixel electrode are formed; etching the passivation film in a manner such that a predetermined portion of the gate bus line is exposed; and forming a counter electrode as a transparent conductive layer, on the passivation film in a manner such that the counter electrode is brought into contact with the exposed portion of the gate bus line, wherein each of the gate bus line and the shielding section are made as a metal film including aluminum.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
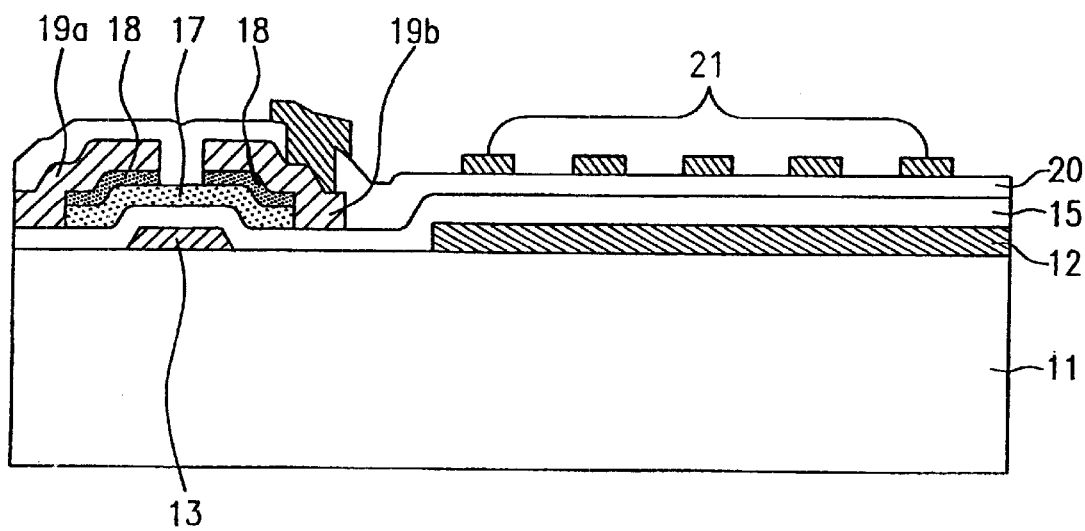
FIG. 1 is a cross-sectional view of an FFS-LCD according to the convention art.

Reference will now be made in greater detail to a preferred embodiment of the invention, an example of which is illustrated in the accompanying drawings. Wherever possible, the same reference numerals will be used throughout the drawings and the description to refer to the same or like parts.

An FFS-LCD in accordance with an embodiment of the present invention includes a lower substrate, an upper substrate which is opposed to the lower substrate at intervals of a predetermined distance, and a liquid crystal layer which is intervened between the upper and the lower substrates. In the present embodiment, only a structure of the lower substrate will be explained, and, since the upper substrate, the liquid crystal layer and other optical elements are constructed in the same manner as in the conventional FFS-LCD, detailed descriptions therefor will be omitted.

Figure 2:
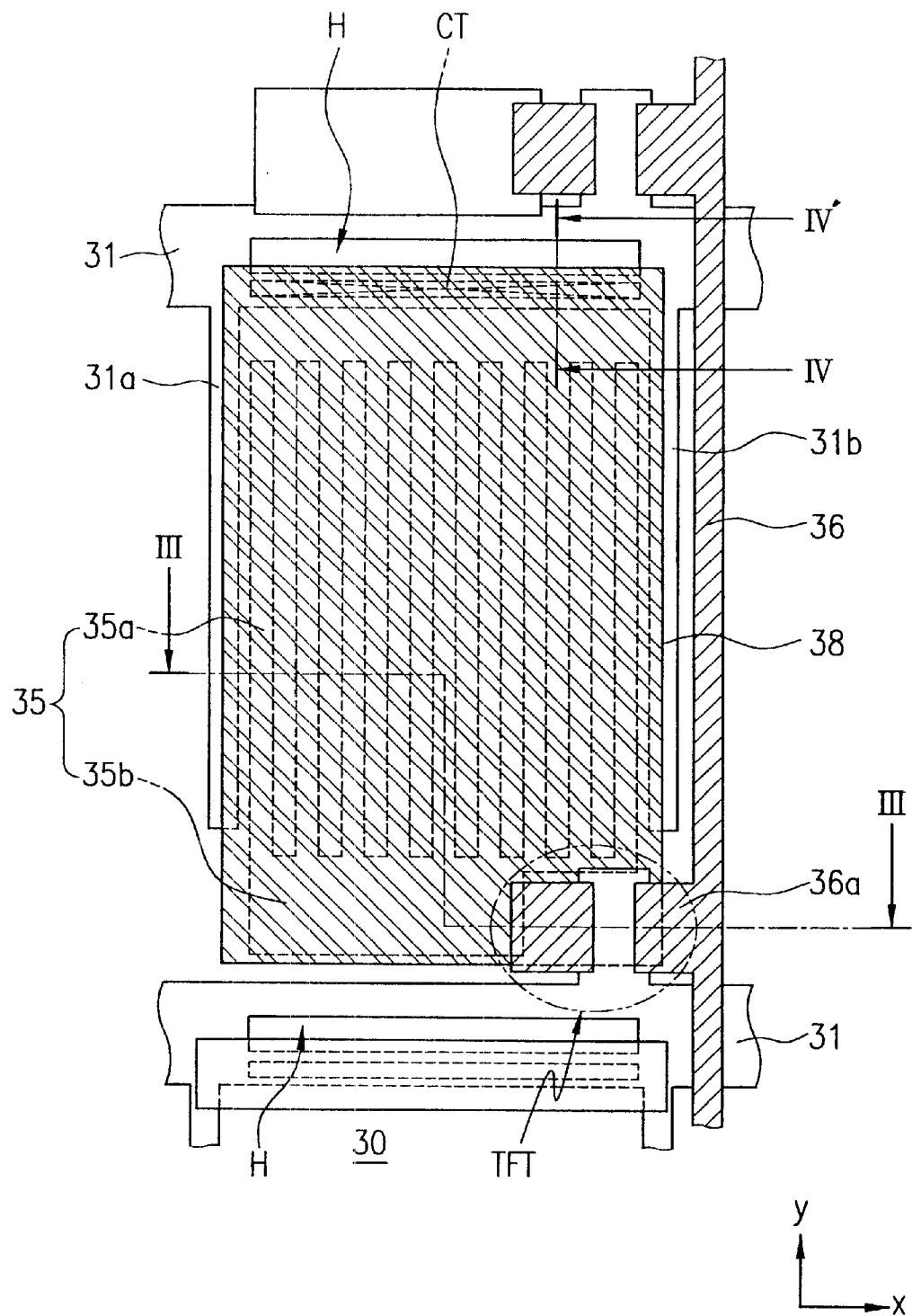
FIG. 2 is a plan view of an FFS-LCD in accordance with an embodiments of the present invention.

First, referring to FIG. 2, a gate bus line 31 extends in an x direction on a plane of FIG. 2, and a data bus line 36 extends in a y direction which is perpendicular to the x direction, whereby a space for a unit pixel, which space has a rectangular contour, is defined. The gate bus line 31 is made of a metal layer including aluminum having a conductivity characteristic which is superior to MoW or Cr, such as an Al/Mo or AlNd/Mo film. Also, the gate bus line 31 includes a pair of shielding sections 31a, 31b which are provided for each pixel in a manner such that the pair of shielding sections 31a and 31b extend parallel to the data bus line 36. Here, the pair of shielding sections 31a and 31b function to prevent a crosstalk from being generated between the data bus line 36 and a pixel electrode which is to be formed afterward. In addition, the pair of shielding sections 31a and 31b and the gate bus line 31 also serve as a storage electrode of the auxiliary capacitance. Further, a slot H used for cutting a gate bus line 31 when a defect is generated in the corresponding gate bus line 31, is formed in a portion of the gate bus line 31 between two data bus lines 36. A gate insulating film (not shown) is intervened between the gate bus line 31 and the data bus line 36, thereby to insulate them from each other. The gate bus line 31 is formed under the gate insulating film, and the data bus line 36 is formed over the gate insulating film. A thin film transistor TFT is located at a place where the gate bus line 31 and the data bus line 36 are crossed with each other.

Each pixel electrode 35 is formed in the space of the unit pixel. Here, the pixel electrode 35 is formed on the gate insulating film. The pixel electrode 35 includes a teeth-shaped section 35a having teeth which are spaced apart one from another by the same distance and parallel one to another, and a bar section 35b which connects one ends of the teeth and is brought into contact with a predetermined portion of the thin film transistor TFT. The pixel electrode 35 is made of a transparent conductive material, for example, an ITO layer.

A counter electrode 38 is formed in the space of the unit pixel in a manner such that the counter electrode 38 is overlapped on the pixel electrode 35. A passivation film (not shown) is intervened between the pixel electrode 35 and the counter electrode 38, wherein the counter electrode 38 is formed on the passivation film. The counter electrode 38 is also made from a transparent conductive material. The counter electrode 38 is formed to have a plate-shaped or a teeth-shaped contour in a manner such that the counter electrode 38 cooperate with the pixel electrode 35 to generate a fringe field. The counter electrode 38 is brought into contact with a previous gate bus line 31 which serves as the storage electrode. The drawing reference symbol "CT" designates a contact region.

In the present embodiment, the pixel electrode 35 and the counter electrode 38 are formed in a manner such that a distance therebetween is smaller than a cell gap between the upper and lower substrates and thereby the fringe field is defined between the pixel electrode 35 and the counter electrode 38. Widths of the counter electrode 38 and the pixel electrode 35 are determined so that liquid crystal molecules existing on the electrodes 35 and 38 can be actuated in a sufficient manner by the fringe field.

Hereinafter, a method for manufacturing the FFS-LCD constructed as mentioned above will be described in detail.

Figure 3:
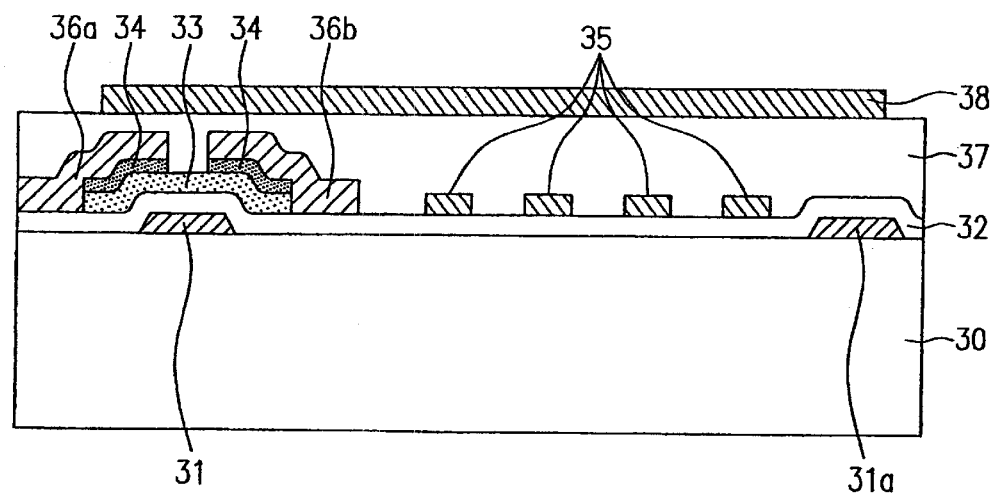
FIG. 3 is a cross-sectional view taken along the line III–III' of FIG. 2.
Figure 4:
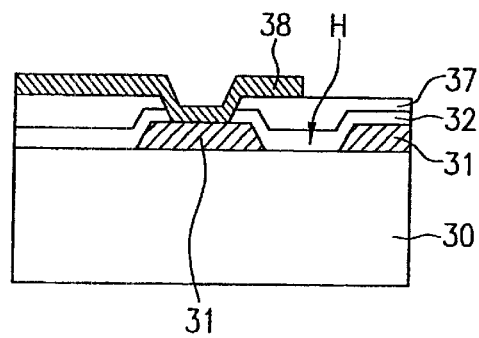
FIG. 4 is a cross-sectional view taken along the line IV–IV' of FIG. 2.

Referring to the FIGS. 2 through 4, the metal layer including aluminum, for example, the Al/Mo or AlNd metal film is deposited on the lower substrate 30 to have a predetermined thickness. Then, a selected portion of the metal layer including aluminum is patterned thereby to form the gate bus line 31 which possesses the pair of shielding sections 31a and 31b. Thereafter, the gate insulating film 32 is deposited on the lower substrate 30 on which the gate bus line 31 is formed. Here, the gate insulating layer 32 can be made of a laminate which is constituted by a silicon oxide layer and a silicon nitride layer. After an amorphous silicon layer and a doped semiconductor layer are sequentially deposited on the gate insulating film 32, they are patterned to include a selected portion of the gate bus line 31, whereby a channel layer 33 and an ohmic layer 34 are formed. A first ITO layer is deposited on the gate insulating film 32 on which the channel layer 33 and the ohmic layer 34 are formed. Thereupon, by the fact that a predetermined portion of the first ITO layer is patterned to be disposed in the space of the unit pixel sideward of the channel layer 33, the pixel electrode 35 is formed. At this time, the pixel electrode 35 is patterned to include a plurality of teeth 35a. Thereafter, the metal film for the data bus line, for example, an Mo/Al/Mo film is deposited on the gate insulating film 32 on which the pixel electrode 35 is formed. Next, a selected portion of the metal film for the data bus line is patterned, whereby source and drain electrodes 36a and 36b which are disposed at both sides of the channel layer 33 and the data bus line 36 which is orthogonal to the gate bus line 31, are formed. At this time, the drain electrode 36b is brought into contact with the bar section 35b of the pixel electrode 35. Then, the ohmic layer 34 which is exposed to have the shape of the source and drain electrodes 36a and 36b, is patterned. By this, the thin film transistor TFT is completed. Here, a process step for forming the pixel electrode 35 and a process step for forming the source and drain electrodes 36a and 36b and the data bus line 36 can be conducted in a reverse order. The passivation film 37 is formed to a selected thickness on the gate insulating film 32 on which the thin film transistor TFT and the pixel electrode 35 are formed. Thereupon, selected portions of the passivation film 37 and the gate insulating film 32 are etched in a manner such that the selected portion of the gate bus line 31 is exposed. Thereafter, the second ITO layer is deposited on the passivation film 37 in a manner such that the second ITO layer is brought into contact with the exposed portion of the gate bus line 31. The second ITO layer is patterned in a manner such that the second ITO layer is positioned in the space of the unit pixel, whereby the counter electrode 38 is formed. At this time, the counter electrode 38 is brought into contact with the front end of the gate bus line 31, as described above.

The present invention is not limited to the above-stated embodiment.

As can be readily understood from the above descriptions, in the embodiment, the pixel electrode is formed to have the teeth-shaped contour, and the counter electrode is formed to have the plate-shaped contour. However, a person skill in the art will recognize that the pixel electrode and the counter electrode are formed to define all possible contours capable of creating a fringe field. For example, the pixel electrode and the counter electrode can be formed in a manner such that the former has the plate-shaped contour and the latter has the teeth-shaped contour, or the pixel electrode and the counter electrode can be formed in a manner such that both of them have the comb teeth-shaped contour.

The FFS-LCD according to the present invention has working effects as described below.

First, since the counter electrode 38 is not formed on the same plane as the gate bus line 31 but formed on the passivation film 37, the gate bus line 31 can be made of the metal layer including aluminum. Hence, signal delay of the gate bus line 31 is remarkably improved, and thereby, the width of the gate bus line 31 can be reduced. As a consequence, an aperture ratio is increased.

Moreover, because a molybdenum laminated film such as the Al/Mo film, the AlNd/Mo film or the like is used as the metal film for the gate bus line 31, Al and ITO are not brought into direct contact with each other when the gate bus line 31 and the counter electrode are brought into contact with each other. Consequently, a contact resistance characteristic is improved.

Furthermore, due to the fact that only the passivation film 37 exists between the pixel electrode 35 and the counter electrode 38, a distance between the pixel electrode 35 and the counter electrode 38 can be reduced, whereby an auxiliary capacitance is elevated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A fringe field switching liquid crystal display comprising:
 a lower substrate;
 a plurality of gate bus lines extending along a selected direction on the lower substrate;
 a plurality of data bus lines disposed on the lower substrate in a manner such that they are crossed with the plurality of gate bus lines, for defining a unit pixel;
 a gate insulating film for insulating the gate bus lines and the data bus lines from each other;
 a thin film transistor located at a place where the gate bus lines and the data bus lines are crossed with each other;
 a pixel electrode formed directly on the gate insulating film, the pixel electrode in contact with the thin film transistor and disposed in a space of the unit pixel;
 a counter electrode overlapped on the pixel electrode and the thin film transistor, the counter electrode cooperating with the pixel electrode for forming a fringe field which actuates all liquid crystal molecules existing on the pixel electrode and the counter electrode; and
 a passivation layer intervened between the pixel electrode and the counter electrode,
 wherein the pixel electrode and the counter electrode are made from a transparent conductive material and the plurality of gate bus lines are made as a metal film including aluminum.

2. The fringe field switching liquid crystal display as claimed in claim 1, wherein the metal film including aluminum is an Al/Mo or AlNd/Mo film.

3. The fringe field switching liquid crystal display as claimed in claim 1, wherein a predetermined portion of the counter electrode in contact with a part of the gate bus line selecting the corresponding unit pixel.

4. A fringe field switching liquid crystal display comprising:
 a lower substrate;
 a plurality of gate bus lines extending along a selected direction on the lower substrate;

a plurality of data bus lines disposed on the lower substrate in a manner such that they are crossed with the plurality of gate bus lines, for defining a unit pixel;

a gate insulating film for insulating the gate bus lines and the data bus lines from each other;

a thin film transistor located at a place where the gate bus lines and the data bus lines are crossed with each other;

a pixel electrode formed directly on the gate insulating film, brought into contact with the thin film transistor and disposed in a space of the unit pixel;

a counter electrode overlapped on the pixel electrode, the counter electrode cooperating with the pixel electrode for forming a fringe field which actuates all liquid crystal molecules existing on the pixel electrode and the counter electrode; and a passivation layer intervened between the pixel electrode and the counter electrode, wherein the pixel electrode and the counter electrode are made from a transparent conductive material, and wherein the plurality of gate bus lines are made as a metal film including aluminum.

5. The fringe field switching liquid crystal display as claimed in claim 4, wherein the metal film including aluminum is an Al/Mo or AlNd/Mo film.

6. The fringe field switching liquid crystal display as claimed in claim 5, wherein a predetermined portion of the counter electrode in contact with a part of the gate bus line selecting the corresponding unit pixel.

7. A method for manufacturing a fringe field switching liquid crystal display, the method comprising the steps of:

forming a gate bus line and a shielding section on a predetermined region of a lower substrate;

depositing a gate insulating film, an amorphous silicon layer and a doped semiconductor layer on the lower substrate;

patterning selected portions of the doped semiconductor layer and the amorphous silicon layer and thereby forming an ohmic layer and a channel layer;

forming a pixel electrode as a transparent conductive layer on the gate insulating film of one side of the channel layer;

forming a source electrode and a drain electrode at both sides of the channel layer and a data bus line which is orthogonal to the gate bus line;

forming a passivation film on the gate insulating film at a place where the data bus line and the pixel electrode are formed;

etching the passivation film and the gate insulating film in a manner such that a predetermined portion of the gate bus line is exposed; and forming a counter electrode as a transparent conductive layer, on the passivation film in a manner such that the counter electrode is brought into contact with the exposed portion of the gate bus line, wherein each of the gate bus line and the shielding section are made as a metal film including aluminum.

8. The method as claimed in claim 7, wherein the metal film including aluminum is an Al/Mo or AlNd/Mo film.

* * * * *